United States Patent [19]

Matsuoka et al.

[11] Patent Number: 4,892,510
[45] Date of Patent: Jan. 9, 1990

[54] V-RIBBED BELT AND THE METHOD OF MANUFACTURING THE SAME

[75] Inventors: Hiroshi Matsuoka; Masaki Ochiai, both of Osaka, Japan

[73] Assignee: Bando Chemical Industries, Ltd., Hyogo, Japan

[21] Appl. No.: 124,524

[22] Filed: Nov. 24, 1987

Related U.S. Application Data

[62] Division of Ser. No. 855,978, Apr. 25, 1986, Pat. No. 4,747,812.

[51] Int. Cl.[4] .............................................. F16G 1/10
[52] U.S. Cl. .................................... 474/252; 156/138; 474/263
[58] Field of Search ............... 474/252, 205, 264, 263, 474/153, 190, 271, 268; 156/138, 137, 139–142

[56] References Cited

U.S. PATENT DOCUMENTS 1,550,983  8/1925  Pratt ...................................... 474/252
3,839,116  10/1974  Thomas et al. ................. 474/252 X
4,047,446  9/1977  Speer .............................. 474/263 X
4,490,428  12/1984  Long .............................. 474/271 X
4,509,938  4/1985  Woodland ....................... 474/265 X Primary Examiner—Thuy M. Bui
Attorney, Agent, or Firm—Armstrong, Nikaido, Marmelstein & Kubovcik

[57] ABSTRACT

A V-ribbed belt having a plurality of ribs on a belt base along the lengthwise direction of belt and a method of manufacturing such V-ribbed belt. The belt according to the present invention is used for driving of driers, auxiliary machines for motor cars, washing machines, etc. ribs of the belt are formed solely of rubber and are provided with a surface layer comprising a non-woven fabric at the outer surface thereof. The thickness and the weight per unit area of the non-woven fabric are in the range of between 0.01 and 0.3 mm and between 3 and 100 g/m² respectively. The non-woven fabric can contain a coefficient of friction reducing agent, where necessary.

6 Claims, 2 Drawing Sheets

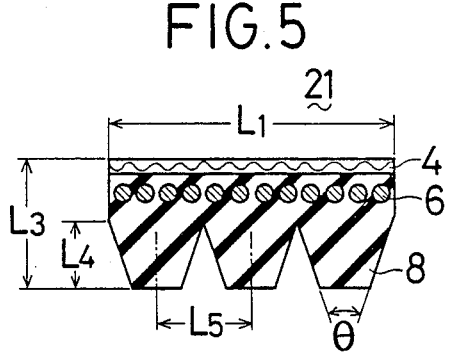
FIG.5
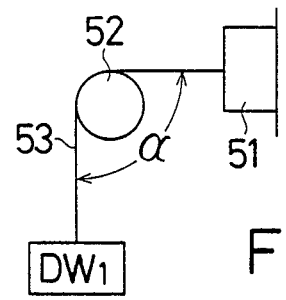
FIG.8
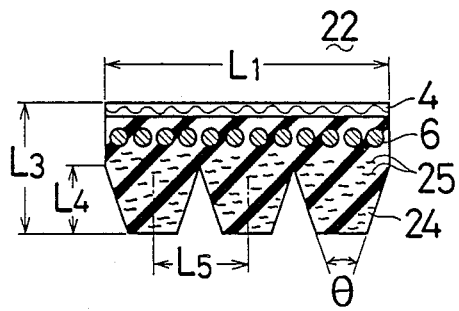
FIG.6
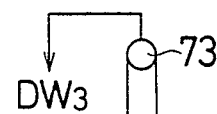
FIG.10
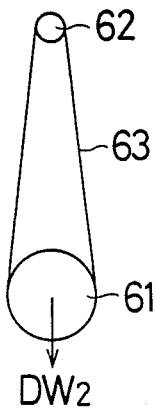
FIG.9
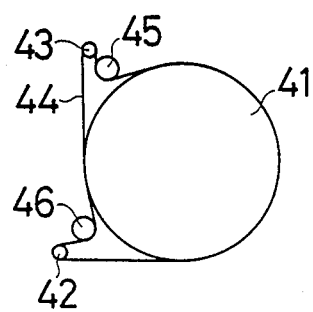
FIG.7
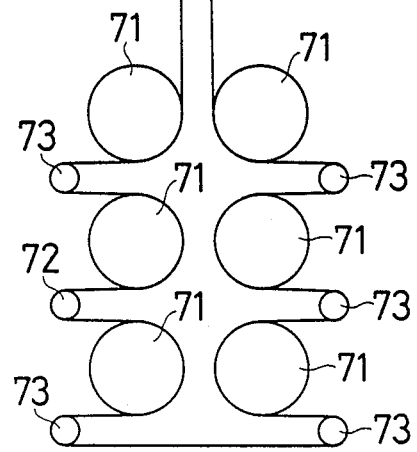

V-RIBBED BELT AND THE METHOD OF MANUFACTURING THE SAME

This is a division of application Ser. No. 855,978 filed Apr. 25, 1986, now U.S. Pat. No. 4,747,812.

BACKGROUND OF THE INVENTION

1. Field of the invention:

This invention relates to a V-ribbed belt having a plurality of ribs on a belt base along the lengthwise direction of belt and the method of manufacturing the same.

2. Description of the prior art:

The V-ribbed belt having a plurality of ribs on a belt base along the lengthwise direction of belt is already known. Such a V-ribbed belt is used as transmission belt, for example, it is used in a household drier as it is wound round a rib groove pulley of small diameter and a plain pulley of large diameter (drum).

In the afore-mentioned V-ribbed belt, ribs are usually made of rubber but are not covered with canvas because fitting of canvas on the outer surface of ribs makes it difficult to have ribs project in the manufacturing process of V-ribbed belt Therefore, in the case of the household drier frictional resistance at the sides of rib becomes large, with the result that abnormal sounds are generated at the start and at the stop of belt running (at the time of overload), at the atmospheric temperature of lower than 0° C. in winter or when the belt running was continued for more than 50 hours. The technique of reducing frictional resistance by mixing short fiber in ribs is also known but this involves lowering of flexuosity and therefore if ribs engage repeatedly with a rib groove pulley of small diameter in the flexed state at a small radius of curvature, ribs crack earlier.

U.S. Pat. No. 3,190,137 discloses a V-ribbed belt having ribs with fiber-flock comprising fine, dense and short fiber, instead of canvas, deposited and adhered onto their outer surface. However, it is difficult technically to adhere fiber uniformly to the outer surface of ribs and this technical difficulty involves the requirement of more number of processes and higher costs, as well as deterioration of quality.

SUMMARY OF THE INVENTION

The present invention relates to improvements on the V-ribbed belt having a plurality of ribs on a belt base along the lengthwise direction of belt and also on the method of manufacturing such V-ribbed belt.

An object of the present invention is to provide a V-ribbed belt having ribs which are made of rubber and are provided with a surface layer of non-woven fabric at the outer surface thereof for reducing a coefficient of friction and for preventing generation of abnormal sounds, without impairing flexuosity, and the method of manufacturing such V-ribbed belt. Since the surface layer of non-woven fabric is flat, a stabilized frictional force can be obtained and consequently stabilization of transmission power and improvement of abrasion-resistance can be obtained.

The method of manufacturing V-ribbed belt according to the present invention comprises the steps of forming a cylindrical unvulcanized body, with a canvas, an unvulcanized rubber sheet, a load carrier, another unvulcanized rubber sheet and a non-woven fabric wound thereon in the order given, on the outer circumferential surface of a rubber sleeve fitted on a forming metal mold; detaching said cylindrical unvulcanized body from the forming metal mold and from the rubber sleeve; and carrying out a vulcanized forming, with non-woven fabric of said unvulcanized body applied to rib grooves of a vulcanizing metal mold.

The non-woven fabric is made solely of synthetic fiber, chemical fiber or natural fiber, such as polyester, polyamide, rayon, vinylon, cellulose, pulp, etc. or a blend thereof. The thickness and weight per unit area (METSUKE) of the non-woven fabric are in the range of between 0.01 and 0.3 mm and between 3 and 100 $g/m^2$ respectively.

Preferably, the non-woven fabric should contain a coefficient of friction reducing agent. Graphite, molybdenum disulfide, fluoric resin powder, etc. are used as a coefficient of friction reducing agent. In the case where graphite is used as a reducing agent, it is desirable that the non-woven fabric is impregnated directly with a mixture of rubber component 100 parts and graphite 1-30 parts or is impregnated indirectly by a coating treatment.

The above-mentioned and other objects and novel features of the present invention will become more apparent by reading the following description of the present invention, with reference to the accompanying drawings.

BRIEF DESCRIPTION OF THE DRAWINGS

The accompanying drawings show a preferred embodiment of the present invention, in which:

FIG. 5 is a longitudinal section of a V-ribbed belt of the first comparative example;

FIG. 6 is a longitudinal section of a V-ribbed belt of the second comparative example;

FIG. 7 is an explanatory drawing of the system employed in the abnormal sound test;

FIG. 8 is an explanatory drawing of the system employed in the coefficient of friction test;

FIG. 9 is an explanatory drawing of the system employed in the abrasion test; and FIG. 10 is an explanatory drawing of the system employed in the multi-shaft bending test.

DETAILED DESCRIPTION OF THE INVENTION

A preferred embodiment of the present invention is described below, with reference to the drawings.

Figure 1:
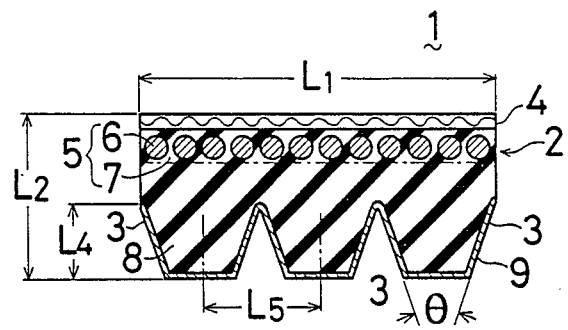
FIG. 1 is a longitudinal section of an example of the V-ribbed belt manufactured according to the method of manufacturing under the present invention.
Figure 2:
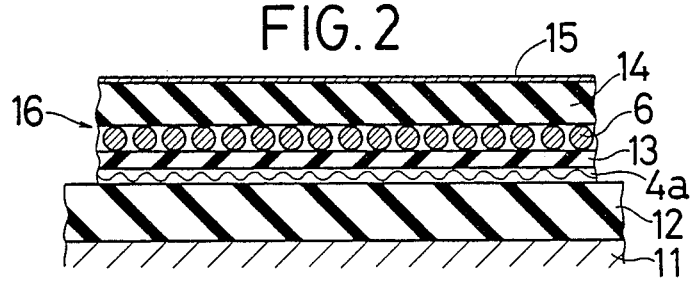
FIG. 2 to FIG. 4 are respectively an explanatory drawing of the method of manufacturing a V-ribbed belt of the first example of the invention.

In FIG. 1, numeral 1 denotes a V-ribbed belt of the present invention having a plurality of ribs 3 on a belt base 2 along the lengthwise direction of belt. Numeral 4 denotes an upper canvas layer which, for example, comprises two layers of cotton canvas. Numeral 5 denotes a layer of load-carrier comprising a load-carrying cord 6 (polyester cord, glass cord, aromatic polyamide cord, etc., for example) embedded in an adhesive rubber 7 (natural rubber, chloroprene rubber, styrennatadiene rubber, isoprene rubber, nitrilebutadien rubber or a blend thereof, for example).

Numeral 8 denotes a rib rubber layer comprising nature rubber, chloroprene rubber, styrenbutadien rubber, isoprene rubber, nitrilebutadiene rubber, or a blend thereof, for example.

Numeral 9 denotes a surface layer of uniform density which comprises a non-woven fabric and is provided at the outer surface of ribs 3. This non-woven fabric may be impregnated with a coefficient of friction reducing agent, such as graphite.

A description is made below about the method of manufacturing the V-ribbed belt stated above.

(i) Process 1

Similarly to the conventional method of forming a V-ribbed belt, a cylindrical rubber sleeve 12 is fitted on a forming metal mold 11.

(ii) Process 2

A cotton canvas 4a which becomes an upper canvas layer 4, a comparatively thin unvulcanized rubber sheet 13 which becomes the adhesive rubber 7, a load-carrying cord 6 and a comparatively thick unvulcanized rubber sheet 14 which becomes the rib rubber layer 8 are wound, in the order given, on the outer circumferential surface of the rubber sleeve 12 which was fitted on the forming metal mold 11 in the Process 1. Then, a non-woven fabric 15 which becomes the surface layer 9 is wound additionally in the lengthwise direction of belt (in circumferential direction) to form an unvulcanized body 16.

(iii) Process 3

After the forming by means of Process 2 was finished, the unvulcanized body 16, together with the rubber sleeve 12, are detached from the forming metal mold 11 and then the unvulcanized body 16 is detached from the rubber sleeve 12.

(iv) Process 4

Figure 3:
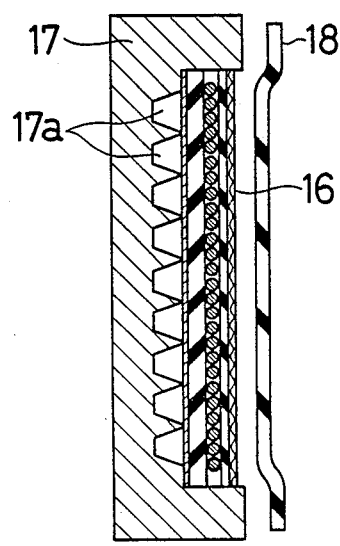
Figure 4:
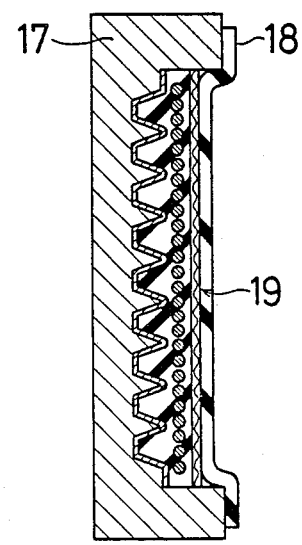

As shown in FIG. 3, the unvulcanized body 16 is inserted in a tubular vulcanizing metal mold 17 with rib grooves 17a at the inner circumferential surface thereof in such a manner that the non-woven fabric 15 of the unvulcanized body 16 is applied to the rib grooves 17a and a vulcanizing sleeve 18 is applied to the inner side (cotton canvas 4a side). As shown in FIG. 4, ribs are projected by applying heat and pressure from the inside of a vulcanizing sleeve 18 so as to subject the whole belt to vulcanizion forming. In this case, different from a woven canvas having strength, the non-woven fabric does not impede the projecting transformation into ribs.

(v) Process 5

A tubular vulcanized body 19 vulcanization-formed at Process 4 is detached from the vulcanizing sleeve 18 and is cut into several pieces so that each piece has the specified number of ribs and thus the desired V-ribbed belt is obtained.

An explanation is made below about tests carried out on the V-ribbed belts of the first and the second examples of the invention (refer to FIG. 1) and on the V-ribbed belts 21, 22 of the first and the second comparative examples (refer to FIG. 5 and FIG. 6).

Belts tested

The non-woven fabric used for the surface layer of V-ribbed belt of the first and the second examples of the invention comprises mixed fiber of pulp and rayon (pulp 15% and rayon 85% in weight) and its weight per unit area is 14 g/m². The non-woven fabric used for the surface layer of V-ribbed belt of the second comparative example is impregnated with a mixture of rubber component 100 parts and graphite 5 parts.

The V-ribbed belt 21 of the first comparative example is different from the V-ribbed belt 1 of the first example of the invention in that the former is not provided with the surface layer 9. The V-ribbed belt of the second comparative example is different from the V-ribbed belt of the first example of the invention in that the former lacks the surface layer 9 but has polyamide fiber 25 (2-denier, 1 mm cut) mixed in the rib rubber layer 24 at 8% cubical contact.

As to the measurement, in FIG. 1, FIG. 5 and FIG. 6 $L_1=4.8$ mm, $L_2=2.3$ m, $L_3=2.0$ mm, $L_4=0.97$ mm, $L_5=1.6$ mm, $0=40°$, belt length=2.210 mm and the number of ribs=3.

Testing method (i) Abnormal sound test

The test was carried out, using a drier having a driving system as shown in FIG. 7. A test belt 44 was wound round a drum 41 (600 mm in diameter), a motor pulley 42 (17 mm in diameter, 1.650 r.p.m.) and a fan pulley 43 (10 mm in diameter), via idle pulleys 45, 46 (each 40 mm in diameter) and was run under the load of 3.0 Kgf of dry cloth.

After the test belt was run continuously for 50 hours and was left for 15 hours in a room of the room temperature 5° C., it was tested for generation of abnormal sound at start and at stop.

(ii) Test of coefficient of friction

As shown in FIG. 8, a test belt 53 was wound round a pulley on driving side 52 from a universal testing machine 51 (strain gauge system Loadcell) at the angle a (rad) and a dead weight $DW_1=1.75$ Kgf was added.

The measuring value T by the Loadcell was measured and the coefficient of friction $\mu$ was calculated from the formula $$\mu = \ln(T/DW_1)/a$$

(iii) Abrasion Test

As shown in FIG. 9, a test belt 63 was wound round between a plain pulley 61 (40 mm in diameter) and a pulley 62 with rib grooves (14 mm in diameter, 4,800 r.p.m.) and was run continuously for 24 hours, with a deadweight $DW_2=18$ Kgf added to the plain pulley 61. Then, abrasion quantity was measured.

$$\text{Abrasion quantity} = \frac{\left[\begin{array}{c}\text{Weight at}\\\text{the initial}\\\text{stage}\end{array}\right] - \left[\begin{array}{c}\text{Weight after con-}\\\text{tinuous running}\\\text{for 24 hours}\end{array}\right]}{\left[\begin{array}{c}\text{Specific}\\\text{gravity of}\\\text{rib rubber}\end{array}\right]}$$

(iv) Multi-shaft bending test

As shown in FIG. 10, a test belt 74 was wound round six plain pulleys 71 (each 76 mm in diameter), a rib groove pulley 72 (16.5 mm in diameter, 1,780 r.p.m.) and six rib groove pulleys 73 on the driven side (16.5 mm in diameter) as it was multi-shaft bent, a deadweight $DW_3=13.5$ Kgf was added, and was run in that state. The length of time until the rib cracks was measured as a bending life (resistance to bending).

Test results
The test results are as shown in the following table.

| | Existence of abnormal sound | $\mu$ | Abrasion quantity (c.c.) | Bending life (hrs.) |
|---|---|---|---|---|
| 1st comparative example | × | 100 | 0.20 | 800 |
| 2nd comparative example | Δ | 90 | 0.15 | 200 |
| 1st example of the invention | ○ | 70 | 0.10 | 800 |

Test results
The test results are as shown in the following table.

| -continued | Existence of abnormal sound | μ | Abrasion quantity (c.c.) | Bending life (hrs.) |
| --- | --- | --- | --- | --- |
| 2nd example of the invention | O | 60 | 0.08 | 800 |

In the column of "existence of abnormal sound" in the above table, X mark indicates that abnormal sound (creaking sound) was heard at start and at stop. Δ mark indicates that abnormal sound was heard slightly. O mark indicates "no abnormal sound". The coefficient of friction μ was indicated by index number, with the coefficient of friction of the first comparative example taken as a standard or 100.

From the above test results, it can be said that the coefficient of friction μ at the sliding surface between the pulley and the belt can be reduced to a large extent, without lowering the bending life, by composing the rib surface with non-woven fabric. This brings about smooth slip at start and at stop (at the time of overload) and eliminates abnormal sounds in the case of driers, for example. Also, by composing the rib surface with non-woven fabric, abrasion-resistance can be improved greatly. Such effect can be increased further by mixing graphite in non-woven fabric.

The V-ribbed belt according to the present invention is applicable to the driving of auxiliary machines for motor cars and various devices in washing machines, etc., as well as driers.

As the present invention can be embodied in various types without departing from its substantial characteristics, the above embodiments have been given solely for explanation purposes and are not of restrictive nature. Furthermore, as the scope of the present invention is not limited by the description made preceding the claim but is limited by the scope of claim for patent, any change in the requirements of the scope of claim for patent and equivalents to such requirements are included in the scope of claim for patent.

What is claimed is:

1. A V-ribbed belt having a plurality of ribs on a belt base along the lengthwise direction of said belt, each of said ribs being formed solely of rubber and having at the outer surface thereof a surface layer molded thereon and vulcanized thereto of a non-woven fabric having a thickness from about 0.01 to about 0.3 mm.

2. A V-ribbed belt as set forth in claim 1, wherein said non-woven fabric is from about 3 to about 100 g/m² in weight.

3. A V-ribbed belt as set forth in claim 1, wherein said surface layer is formed of non-woven fabric which is made of mixed fiber comprising pulp 15% and rayon 85% by weight.

4. A V-ribbed belt as set forth in claim 1, wherein said non-woven fabric contains a coefficient of friction reducing agent.

5. A V-ribbed belt as set forth in claim 4, wherein said coefficient of friction reducing agent is graphite and said non-woven fabric is impregnated with a mixture of rubber component 100 parts and graphite 1–30 parts.

6. A V-ribbed belt as set forth in claim 5, wherein said surface layer is formed of non-woven fabric which is made of mixed fiber of pulp 15% and rayon 85% by weight and is 14 g/m² by weight.

* * * * *